United States Patent [19]

Paige

[11] Patent Number: 5,422,555
[45] Date of Patent: Jun. 6, 1995

[54] APPARATUS AND METHOD FOR ESTABLISHING A REFERENCE SIGNAL WITH AN LVDT

[75] Inventor: Nicholas Paige, Chester, Vt.

[73] Assignee: Rank Taylor Hobson, Ltd., England

[21] Appl. No.: 55,182

[22] Filed: Apr. 30, 1993

[51] Int. Cl.⁶ .............................................. G05B 13/00
[52] U.S. Cl. .................................... 318/657; 318/466; 318/468
[58] Field of Search ............................. 318/466–470, 318/487, 652, 653, 657, 602, 603, 656

[56] References Cited

U.S. PATENT DOCUMENTS

| | | | |
|---|---|---|---|
| 3,684,961 | 8/1972 | Muir | 318/653 X |
| 4,514,689 | 4/1985 | Gerard | 324/208 |
| 4,651,130 | 3/1987 | Pennell | 318/657 X |
| 4,678,991 | 7/1987 | Schmidt | 318/657 X |
| 4,751,647 | 6/1988 | Millay et al. | 364/474 |
| 4,783,626 | 11/1988 | Shimizu | 324/208 |
| 4,786,869 | 11/1988 | Kanai et al. | 324/207 |
| 4,847,548 | 7/1989 | Lafler | 323/264 |
| 4,855,675 | 8/1989 | Russell et al. | 324/208 |
| 4,866,437 | 9/1989 | Morra | 340/870.36 |
| 4,881,414 | 11/1989 | Setaka et al. | 73/862.33 |
| 4,891,568 | 1/1990 | Shibata et al. | 318/603 X |
| 4,896,110 | 1/1990 | Shimizu et al. | 324/208 |
| 4,904,921 | 2/1990 | DeVito et al. | 323/264 |
| 4,937,523 | 6/1990 | Duverger et al. | 324/207.18 |
| 5,087,866 | 2/1992 | Smith | 318/657 X |

FOREIGN PATENT DOCUMENTS 62-215802 9/1987 Japan.

*Primary Examiner*—William M. Shoop, Jr.
*Assistant Examiner*—Brian Sircus
*Attorney, Agent, or Firm*—Lerner, David, Littenberg, Krumholz & Mentlik

[57] ABSTRACT

A system for creating a position reference signal includes a linear variable differential transformer (LVDT), a magnetically permeable core capable of entering and existing the chamber of the LVDT, a positioning means for moving the core in forward and backward directions through a home location in which the core is within said LVDT, and a signal conditioner means for receiving the signals from the secondary windings and outputting a value so that when the core approaches the home location from the forward direction, the value first changes polarity only when the core passes through the home location. Preferably, the value is always positive or always negative when the core is at a location outside of the chamber.

A process of creating a reference signal includes moving a magnetically permeable core from outside of a chamber of an LVDT to inside the chamber, creating an output signal from the voltages of the secondary windings of the LVDT, and sending a signal to a control means when the output signal changes from positive to negative after the voltage of one of the secondary windings has peaked for all possible locations of the core.

3 Claims, 4 Drawing Sheets

APPARATUS AND METHOD FOR ESTABLISHING A REFERENCE SIGNAL WITH AN LVDT

BACKGROUND OF THE INVENTION

In the manufacturing industry, there is a great need for high precision instruments which are capable of measuring distances within exacting tolerances. Even if a machine is able to measure and move within precise limits, it is desirable for the initial position of the measuring apparatus to be consistent from day to day. If a machine measures distance with respect to a home position, the accuracy of the machine will depend upon the accuracy of the home position.

Accordingly, the linear variable differential transformer (LVDT), which is capable of measuring extremely small changes in distance, has been extensively used in measurement instrumentation. Unfortunately, the LVDT, which is relatively inexpensive, presents certain limitations which prevent its extensive use within high quality measurement apparatus. For example, the cores within typical LVDTs are usually permanently positioned within the chamber of the LVDT, preventing the core from leaving the chamber. Therefore, the measuring apparatus which is mechanically connected to the core is not able to travel distances beyond that afforded by the LVDT. If the core is able to exit the chamber of the LVDT, the measuring apparatus must take into account the presence of stray signals within the secondary windings even when the core is absent. Due to manufacturing tolerances, these stray signals may vary in both magnitude and polarity. Although the manufacturing tolerances may be controlled, such control is quite expensive.

Accordingly, there is a need for a measuring apparatus which can use inexpensive LVDT's in a highly precise measuring instrument.

SUMMARY OF THE INVENTION

The present invention addresses these needs.

One aspect of the present invention provides a system for creating a position reference signal which includes a linear variable differential transformer (LVDT) having a primary winding, a first secondary winding, and a second secondary winding such that the windings define a chamber. Also included is a magnetically permeable core capable of entering and exiting the chamber, and a positioning means moving the core in forward and backward directions with respect to the LVDT through a home location in which the core is within the LVDT. Further, a signal conditioner means is included for receiving signals from the secondary windings and outputting an output signal having a value. The signal conditioner is operative so that when the core approaches the home location from the forward direction, the value first changes polarity only when the core passes through the home location.

Preferably, the value is positive when the core is at a first location immediately adjacent the home location in the backward direction and negative at a second location immediately adjacent the home location in the forward direction. Yet further, it is desired that the positioning means comprise a slide having two ends and a stationary slide support in association with the slide, the core mounted on the slide.

The system may also include control means having a motor for moving the slide certain distances, a memory for storing the location of the home location, and a means for calculating distances relative to that home location.

Preferably, the positioning means is initially disposed such that the core is at a start location in the backward direction from the home location. The motor is operative to move the positioning means in the forward direction until the polarity change in the value indicates that the positioning means is at the home location. The system may also comprise a polarity detector connected between the control means and the signal conditioner so that the polarity detector informs the control means that the positioning means is at the home location when the value is negative. The polarity may include a comparator and an optical isolator.

In another aspect of the present invention, the system comprises a linear variable differential transformer having a primary winding, a first secondary winding, a second secondary winding, a voltage across each winding, and the windings defining a chamber. A magnetically permeable core is capable of movement in a forward and backward direction and to locations within and without of the chamber. A signal conditioner means is connected to the secondary windings and outputs an output signal having a value, the value being always positive or always negative when the core is at a location outside of the chamber in the first or backward directions.

Preferably, where the voltage of the first secondary voltage is Vs1 and the voltage of the second secondary winding is Vs2, the output voltage is proportional to $(Vs1 - |Vs1 - Vs2|) / (Vs1 + |Vs1 - Vs2|)$. Desirably, the signal conditioner includes a reference node, a first node$_A$, and a second node$_B$, whereby the nodes receive voltages and the value of the output signal is proportional to $(Va - Vb)/(Va + Vb)$ where Va equals the difference between the voltage at the first node$_A$ and the voltage at the reference node, and where Vb equals the difference between the voltage at the second node$_B$ and the voltage at the reference node. The secondary windings may have two ends, with one end of the first secondary winding connected to the reference node, the other end of the first secondary winding connected to the first node$_A$, one end of the second secondary winding connected to the first node$_A$, and the other end of the second secondary winding connected to the second node$_B$.

In yet another aspect of the present invention, a process for creating a position reference signal uses an LVDT having a primary winding, a first secondary winding, a second secondary winding, and the windings defining a chamber having two ends with one end being an entry end. The process comprises applying a voltage to the primary windings; starting a magnetically permeable core at a start location outside of the chamber of the LVDT; moving the magnetically permeable core into the chamber of the LVDT via the entry end of the chamber; passing the voltages at the secondary windings to a signal conditioner; creating an output signal from the signal conditioner which remains positive until after the core has begun passing into the chamber; sending a signal to a control means when the output signal changes from positive to negative and after the voltage at one of the secondary windings has peaked for all possible locations of the core with respect to the chamber; and storing in the control means the location of the positioning means when the output signal changes from positive to negative.

Preferably, the process further includes moving the positioning means predetermined distances measured with respect to the location of the positioning means when the output signal changes from positive to negative. Desirably, the step of sending a signal to the control means includes receiving the output of the signal conditioner by a polarity detector and sending a signal from the polarity detector to the control means when the output signal changes from positive to negative.

DETAILED DESCRIPTION OF THE PREFERRED EMBODIMENT

Figure 1:
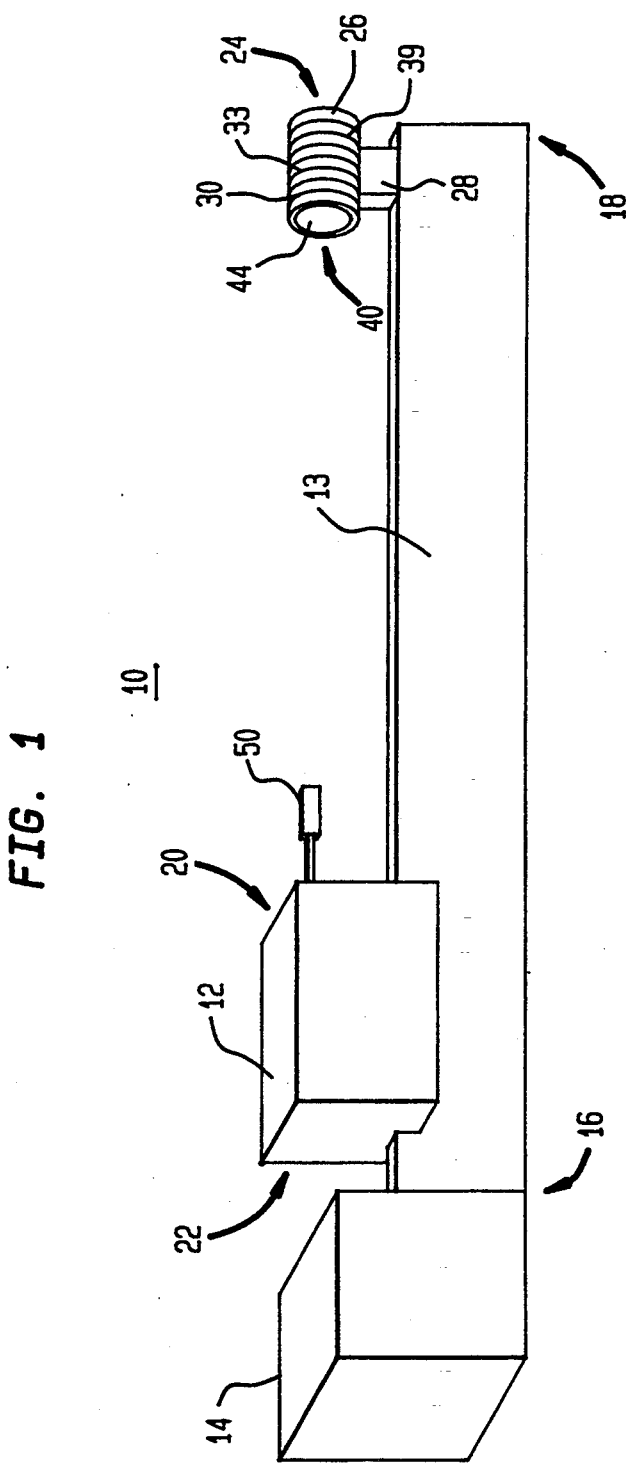
FIG. 1 is a schematic view of a system in accordance with one embodiment of the present invention.

FIG. 1 is a diagrammatic view of a system 10 for establishing a marker or home signal for positioning means. A moveable slide 12 is mounted on a stationary slide support 13 such that the slide may glide along the support. The support has two ends 16 and 18, and preferably the slide moves along the longitudinal axis between ends 16 and 18. For ease of reference, the direction of the slide as it moves towards end 18 of slide support 13 shall be referred to as the forward direction, and the direction of the slide as it moves towards end 16 of the slide support 13 shall be referred to as the backward direction.

A motor 14 communicates with and moves the slide 12 by means conventional in the art, such as a conveyor, shaft, or the like (not shown). Desirably, motor 14 drives slide 12 with a high degree of precision. For example, motor 14 of the preferred embodiment can move slide 12 predetermined distances with an accuracy of 5/1,000,000 inch.

Slide 12 has a front end 20, a back end 22, and a magnetically permeable core 50 mounted on the front end. Core 50 can be of any magnetically permeable substance, including ferromagnetic materials.

Disposed at end 18 of slide support 12 is a linear variable differential transformer (LVDT) 24. The LVDT 24 includes a hollow cylindrical casing 26 which rests upon a support structure 28. The cylindrical casing defines a chamber 40 which is open at both ends. One end 44 of the chamber 40 faces towards core 50 (hereinafter, the entry end). The longitudinal axis of chamber 40 is parallel with the longitudinal axis of slide support 13. The chamber 40 is of sufficient size to receive core 50, and the support structure 28 places the LVDT 24 at a height and position to allow the entry of core 50 into chamber 40. Windings 30, 33, and 39 are wrapped around the outer surface of casing 26.

Figure 2:
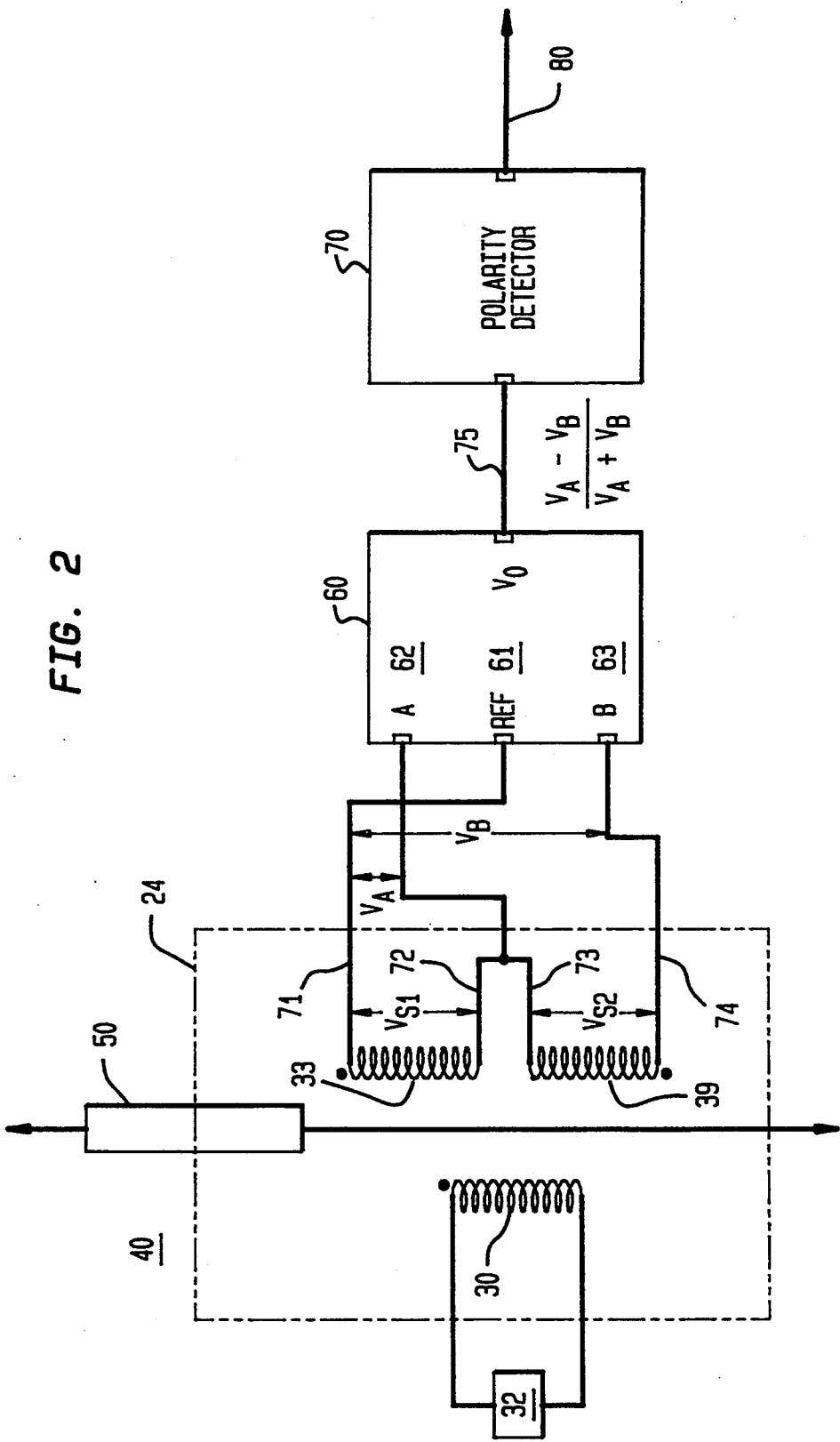
FIG. 2 is a schematic diagram of circuitry in accordance with one embodiment of the present invention.

The leads of the windings are connected as shown in the schematic diagram of FIG. 2. An excitation voltage 32 is applied to primary winding 30 of LVDT 24. The first and second secondary windings, 33 and 39 respectively, are magnetically coupled with primary winding 30. The secondary windings are in turn connected to a signal conditioner 60. One end 71 of first secondary winding 33 is connected to reference node 61 of the signal conditioner. The other end 72 of first secondary winding is connected to node$_A$ 62 of signal conditioner 60. Also connected to first secondary winding end 72 is one end 73 of second secondary winding 39. The other end 74 of second secondary winding 39 is connected to node$_B$ 63 of the signal conditioner. The secondary windings are oppositely wound with respect to one another, and therefore, when an excitation voltage is applied to primary winding 30, the voltage Vs1 across first secondary winding 33 will be opposite to the voltage Vs2 across second secondary winding 39. The output of signal conditioner 60 is a voltage (Vo) on line 75 proportional to (Va−Vb)/(Va+Vb), where Va is difference in the voltage between node$_A$ 62 and the reference node 61, and Vb is the difference in the voltage between node$_B$ 63 and the reference node 61. The nodes are not polarity sensitive, but merely use the magnitude of the signal irrespective of polarity. At least one commercially available signal conditioner which is capable of producing the desired output is the AD598 LVDT Signal Conditioner offered by Analog Devices.

Figure 4:
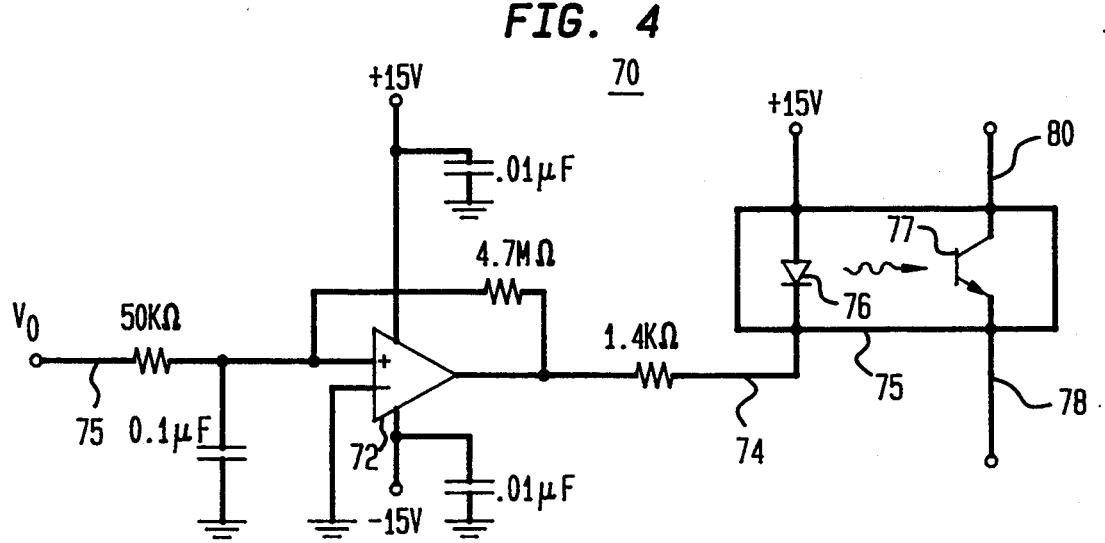
FIG. 4 is a schematic diagram of circuitry in accordance with one embodiment of the present invention.

The output signal of signal conditioner 60 is fed into polarity detector 70. Output 80 of polarity detector 70 is true or low whenever the polarity detector 70 detects a negative signal from signal conditioner 60. An example of polarity detector 70 is shown in FIG. 4. An operational amplifier 72 is configured as a comparator, such that its output voltage is maximum low whenever the voltage on line 75 is negative, and maximum high whenever the voltage on line 75 is positive. The output 74 of operational amplifier 72 is fed into an optical isolator 75, such as the 4N33 by Motorola. The equivalent transistor 77 will allow current to flow only when the voltage on line 74 is low enough to allow current to flow through LED 76. Accordingly, current will flow through output line 80 attached to transistor 77 only when the voltage along line 75 is negative. The other line 78 leaving transistor 77 is connected to ground or a voltage source.

Figure 3:
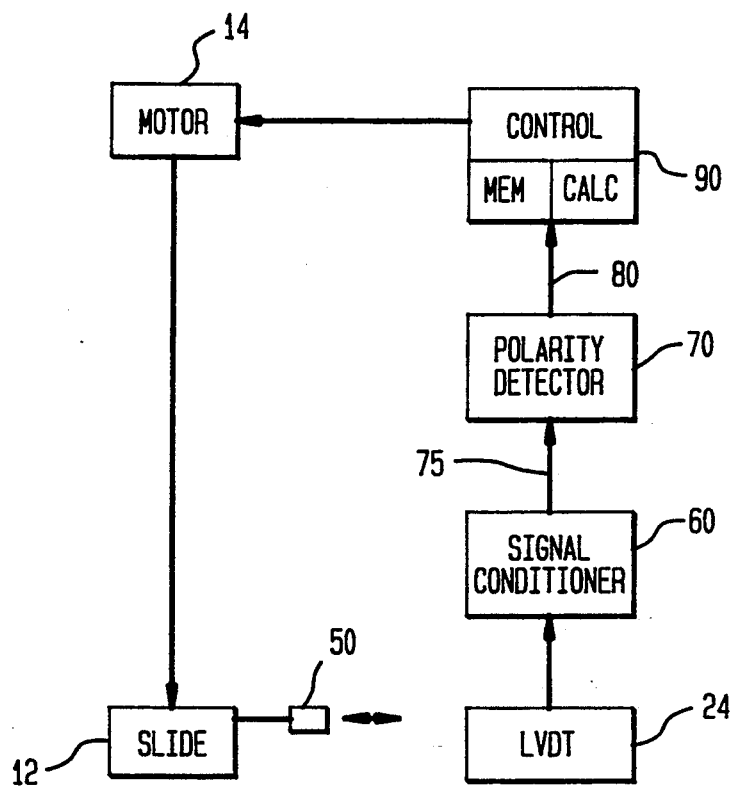
FIG. 3 is a block diagram of a system in accordance with one embodiment of the present invention.

As seen in FIG. 3, the output of polarity detector 70 is fed to a control 90 via output line 80. Control 90 uses transistor 77 like a switch. When line 80 indicates that the input to polarity detector 70 is negative, control 90 stores the physical position of slide 12 in the control's memory (hereinafter, the home location). In addition to storing the home location, control 90 also operates motor 14, instructing the motor when and how far to move slide 12. The control 90 calculates distances with respect to the home location.

In operation, the system is calibrated to find the home location. At the beginning of each calibration cycle, the slide will always face the same entry end 44 of chamber 40, and core 50 will be outside of chamber 40. From this starting location, which may be any distance from LVDT 24, control 90 will instruct motor 14 to begin moving slide 12 and core 50 in the forward direction towards LVDT 24. At the same time, excitation voltage 32 will apply a time-varying current to primary winding 30, thus creating an electromagnetic field about the primary winding (FIG. 2). Preferably, the starting location is far enough from LVDT 24 that core 50 has little to no effect on the electromagnetic fields surrounding the windings.

The corresponding current and voltage imposed on the secondary windings 33 and 39 due to the electromagnetic field of primary winding 30 will vary depending on how far core 50 is within or without of chamber 40. As core 50 gets closer to first secondary winding 33, more of the electromagnetic field will be transferred to first secondary winding 33, and more current and voltage will be imposed at the first secondary winding. Likewise, as core 50 gets closer to second secondary winding 39, more of the electromagnetic field will be transferred to second secondary winding 39, and more current and voltage will be imposed at the second secondary winding. If core 50 is exactly in between the first and second secondary windings, the voltage across each secondary winding will be equal.

Even if core 50 is a great distance from chamber 40, a small amount of current will be present in the secondary windings because some of the electromagnetic field surrounding primary windings 30 will still reach the secondary windings even absent core 50. Ideally, the voltage across both secondary windings would be equal. However, because of manufacturing tolerances, the secondary windings will not be identically wound, and therefore, the currents in the secondary windings will not be identical.

The voltages of the secondary windings are passed to signal conditioner 60. Specifically, because one end 71 of first secondary winding 33 is connected to the reference node 61 and because the other end 72 of first secondary winding 33 is connected to node$_A$ 62, the voltage at node$_A$ 62 with respect to the reference node is equivalent to the voltage across first secondary winding 33 ($Vs1$). However, because one end 74 of second secondary winding 39 is connected to node$_B$ 63 and the other end 73 of secondary winding 39 is connected to end 72 of first secondary winding 33, node$_B$ 63 will receive the total voltage across both secondary windings. As the secondary windings are oppositely wound, the voltage at node$_B$ will actually be the difference between the voltages across each secondary winding ($|Vs1-Vs2|$). The absolute value about $Vs1-Vs2$ is indicative of the insensitivity of signal conditioner 60 to the polarity of input voltages.

Under the above parameters, with the first secondary winding voltage $Vs1$ applied to node$_A$, and the total voltage across both secondary windings $|Vs1-Vs2|$ applied to node$_B$, the output $Vo$ of signal conditioner 60 will be proportional to:

$$(Vs1-|Vs1-Vs2|)/(Vs1+|Vs1-Vs2|).$$

Figure 5:
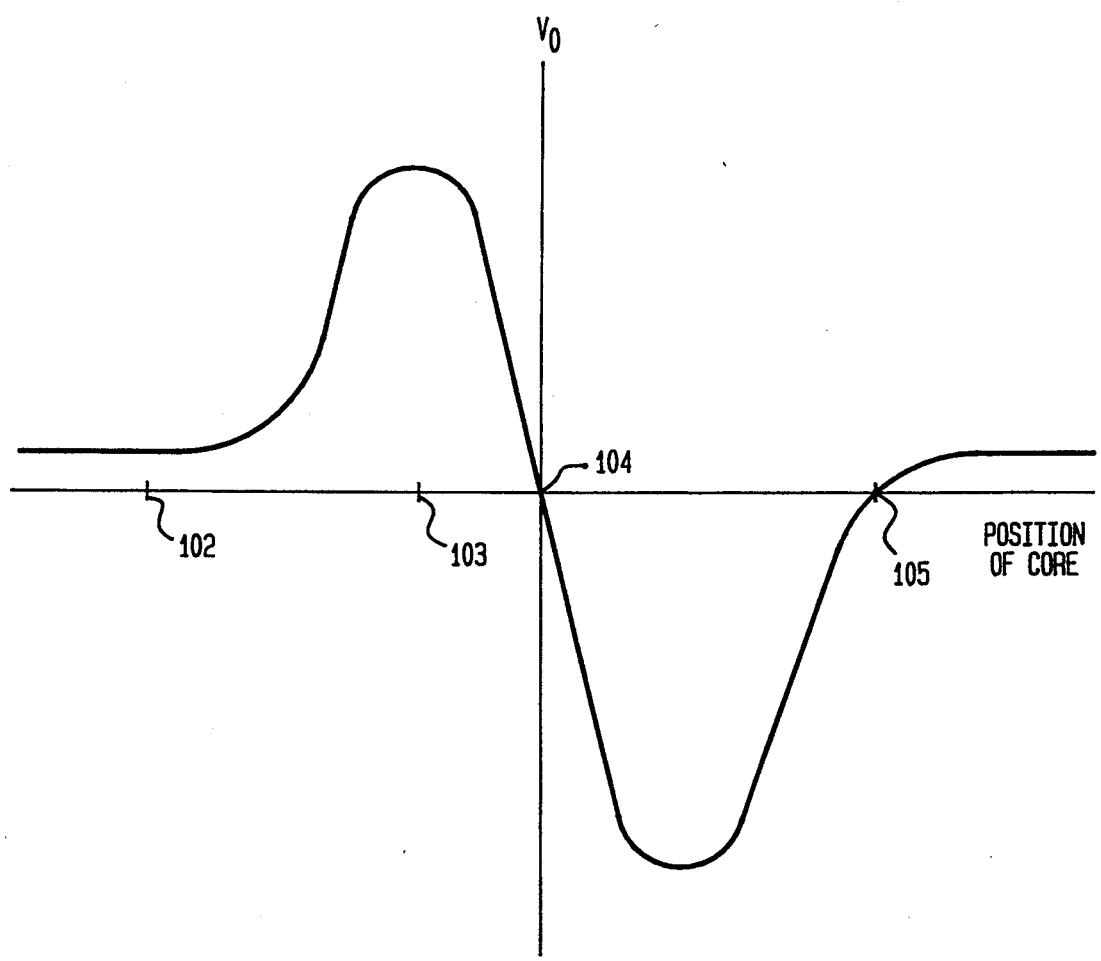
FIG. 5 is a graph of the output of a signal conditioner in accordance with one embodiment of the present invention.

While the theory of operation is not essential to this invention, the output of the signal conditioner 60 is contemplated to appear as the graph shown in FIG. 5. The y-axis reflects the voltage of the output signal from signal conditioner 60, and the x-axis reflects the physical position of the core with respect to the chamber. At the origin, the core will be partially or completely within the chamber. To the far left of the y-axis, the core will be well outside of the chamber with core 50 facing entry end 44. To the far right of the y-axis, core 50 will extend out the other end of chamber 40 opposite entry end 44, although front end 20 of slide 12 will remain facing entry end 44.

At the starting location 102 of the core, when the core is far from chamber 40, the voltage in each secondary winding will be small and nearly equal. Therefore, $Vo$ will always be positive because the difference between the voltages at the first and secondary windings will not be greater than the voltage of the first secondary winding. In other words, $Vs1-|Vs1-Vs2|$ will always be positive, as will $Vs1+|Vs1-Vs2|$. As core 50 moves towards and into chamber 40, $Vo$ will peak when core 50 is at point 103, when the core is between the windings of the first secondary winding 33. As the core travels closer to the second secondary winding 39, $Vs1$ will decrease, $Vs2$ will increase, and $Vo$ will decrease.

When the core 50 reaches a point 104 approximately midway within chamber 40 (when $Vs2$ is twice as large $Vs1$), $Vo$ will equal zero or null, and any farther movement in the forward direction will cause $Vo$ to become negative. Polarity detector 70 detects this negative condition, and sends a signal to control 90 along line 80. Control 90 responds by storing the exact location (the home location) of slide 12 when the negative condition was encountered. In other words, control 90 remembers the exact physical position of slide 12 when the output of the signal conditioner became negative. Upon storing the home location, the calibration process is completed.

When control 90 instructs motor 14 to move slide 12, all distances travelled by the slide are measured with respect to the home location. Because the components of the system 10 do not change, the home location will always remain the same, even if the entire system is depowered and repowered. Consequently, slide 12 provides highly accurate measurements every time it is used because of the high precision and consistency of the home location, in addition to the motor which is capable of moving the slide to highly precise distances with respect to that home location.

Because the system finds a home signal by detecting a negative signal from the signal conditioner, the first and only negative signal outputted by the signal conditioner during the calibration process should be a signal corresponding with the home location of the slide. In other words, if a null point is defined as a point on the output of the signal conditioner where such output signal changes polarity, then the only null point encountered by the slide during the calibration process should correspond with the home location. As seen in FIG. 5, a second null appears at the far right of the y-axis at point 105. As described above, $Vo$ will always be positive when the core is outside of chamber 40. Therefore, if the core were to approach chamber 40 from opposite entry end 44, i.e., from the backwards direction, $Vo$ would change from the positive to the negative at point 105. Accordingly, it is recommended that slide 12 always start facing the end of the LVDT which will not produce a null until the core and slide reach the home location.

One advantage of the present system is this ability to ensure that the output of the signal conditioner remains positive until the home location is encountered. As discussed, because of manufacturing defects, one cannot know beforehand whether $Vs1$ or $Vs2$ will be greater when core 50 is not within chamber 40. For example, if the circuit of FIG. 2 was not used, but instead node$_A$ was to receive the voltage of the first secondary winding and node$_B$ were to receive the voltage of the second secondary winding, then the output of the signal conditioner would be $(Vs1-Vs2)/(Vs1+Vs2)$. With this configuration, $Vo$ may be positive or negative when core 50 is absent, depending upon the nature of the manufacturing defect. Accordingly, if $Vo$ is initially negative at the starting location, then the polarity detector 70 will indicate a false home location. Therefore, as shown in FIG. 5, rather than one known false home location 105 on one side of home location 104, the above configuration may have a false home location on the other side of home location 104. The present invention negates this possibility by connecting the LVDT to the input of the signal conditioner 60 as described. Under the present invention, a false home location 105 occurs only in one direction and on one side of the LVDT. This side is known and avoided before the calibration process begins.

Although the electrical signals discussed above are described in terms of positive and negative, the designation of positive or negative is arbitrary as long as the terms accurately describe a change in an electrical signal rather than a particular electrical charge. For example, all the signals could be offset by a direct voltage. In such a case, polarity detector 70 would test the signals by comparing them to the offsetting direct voltage. Also, the signals could be consistently inverted, further preserving the operation of the present invention while reversing the signals' polarity.

The designations of backward and forward directions are likewise aritrary, and are only necessary to refer to changes in direction and the direction of one element with respect to another element.

The home system 10 may include further means to aid its operation. For example, a proximity detector could be added to the system to notify the controller that the core 50 is getting close to chamber 40. The proximity detector would slow the velocity of the slide 12 as it approaches LVDT 24. If the core 50 is travelling too fast, the system 10 may not establish consistent home locations.

once the home location is found, it is not necessary for the slide to move in only two directions. Because the core may freely enter and exit chamber 40 of LVDT 24, slide 12 is physically capable of movement in any direction with respect to the home location once core 50 leaves chamber 40. Accordingly, the present invention is not restricted to the limited movement of a core within a LVDT.

Further, it is also possible for the windings of the LVDT to be affixed to the slide, and mount the core in a stationery position with respect to the slide support.

As these and other variations and combinations of the features described above can be utilized without departing from the present invention as defined in the appended claims, the foregoing description of the preferred embodiments should be understood as being illustrative rather than as limiting the invention as defined in the claims.

I claim:

1. A system comprising
   a linear variable differential transformer having a primary winding, a first secondary winding having two ends, a second secondary winding having two ends, a voltage Vs1 across said first secondary winding, a voltage Vs2 across said second secondary winding, and said primary, first secondary and second secondary windings defining a chamber,
   a magnetically permeable core capable of movement in a forward and backward direction, and to locations within and without of said chamber,
   a signal conditioner means for outputting an output signal having a value, said signal conditioner having a reference node, a first node$_A$ and a second node$_B$, said nodes for receiving voltages and the value of said output signal being proportional to (Va−Vb) / (Va+Vb) where Va is the difference between the voltage at said first node$_A$ and the voltage at said reference node, and Vb is the difference between the voltage at said second node$_B$ and the voltage at said reference node,
   said signal conditioner connected to said secondary windings such that one end of said first secondary winding is connected to said reference node and the other end of said first secondary winding is connected to said first node$_A$, one end of said second secondary winding is connected to said first node$_A$, and the other end of said second secondary winding is connected to said second node$_B$, and
   said value of said output signal being always positive or always negative when said core is at a location outside of said chamber in said forward or backward directions, and said value being proportional to (Vs1−|Vs1−Vs2|) / (Vs1+|Vs1−Vs2|).

2. The system of claim 1 further comprising control means for receiving said output signal and storing the location of said magnetically permeable core if said output signal changes from positive to negative.

3. The process of claim 2 further comprising a polarity detector for receiving said output signal and sending a polarity signal to said control means if said output signal changes from positive to negative.

* * * * *